(12) United States Patent
Geyer et al.

(10) Patent No.: US 8,886,058 B2
(45) Date of Patent: Nov. 11, 2014

(54) CYCLE SLIP REDUCTION IN COHERENT OPTICAL COMMUNICATIONS

(75) Inventors: Jonas Geyer, Seukendorf (DE); Andreas Bisplinghoff, Hallerndorf (DE); Theodor Kupfer, Feucht (DE)

(73) Assignee: Cisco Technology, Inc., San Jose, CA (US)

( * ) Notice: Subject to any disclaimer, the term of this patent is extended or adjusted under 35 U.S.C. 154(b) by 348 days.

(21) Appl. No.: 13/487,350

(22) Filed: Jun. 4, 2012

(65) Prior Publication Data
US 2013/0322870 A1 Dec. 5, 2013

(51) Int. Cl.
*H04B 10/06* (2006.01)

(52) U.S. Cl.
USPC .......................................... 398/208; 398/202

(58) Field of Classification Search
CPC .................................................. H04B 10/6165
See application file for complete search history.

(56) References Cited

U.S. PATENT DOCUMENTS

| | | | | |
|---|---|---|---|---|
| 8,095,019 | B2 * | 1/2012 | Kaneda et al. | 398/208 |
| 8,260,153 | B2 * | 9/2012 | Xie | 398/202 |
| 8,311,417 | B1 * | 11/2012 | Poggiolini et al. | 398/208 |
| 8,315,528 | B2 * | 11/2012 | Roberts et al. | 398/208 |
| 8,340,530 | B2 * | 12/2012 | Cai | 398/163 |
| 8,442,406 | B2 * | 5/2013 | Li et al. | 398/204 |
| 8,452,186 | B2 * | 5/2013 | Sun et al. | 398/152 |
| 8,478,135 | B2 * | 7/2013 | Xie | 398/208 |
| 8,494,368 | B2 * | 7/2013 | Xie et al. | 398/81 |
| 2003/0021336 | A1 * | 1/2003 | Iwasaki | 375/147 |
| 2006/0245766 | A1 * | 11/2006 | Taylor | 398/208 |
| 2009/0190926 | A1 * | 7/2009 | Charlet et al. | 398/74 |
| 2010/0138722 | A1 * | 6/2010 | Harley et al. | 714/762 |
| 2010/0232788 | A1 | 9/2010 | Cai | |
| 2010/0232797 | A1 * | 9/2010 | Cai et al. | 398/79 |
| 2010/0254702 | A1 * | 10/2010 | Sun et al. | 398/25 |
| 2011/0142449 | A1 * | 6/2011 | Xie | 398/65 |
| 2011/0150505 | A1 * | 6/2011 | Roberts et al. | 398/208 |
| 2011/0318021 | A1 * | 12/2011 | Zhou | 398/202 |
| 2012/0002979 | A1 * | 1/2012 | Xie | 398/208 |
| 2012/0033965 | A1 * | 2/2012 | Zhang et al. | 398/38 |
| 2012/0068748 | A1 | 3/2012 | Stojanovic et al. | |

(Continued)

OTHER PUBLICATIONS

A.Bisplinghoff et al;slip-reduced carrier phase estimation for coherent transmission in the presence of non-linear noise; 2013; optical society of America.*

(Continued)

*Primary Examiner* — Ken Vanderpuye
*Assistant Examiner* — Amritbir Sandhu
(74) *Attorney, Agent, or Firm* — Edell, Shapiro & Finnan, LLC

(57) ABSTRACT

Carrier phase estimation techniques are provided for processing a received optical signal having a carrier modulated according to a modulation scheme. First and second carrier phase estimation operations are performed on a digital signal derived from an optical carrier obtained from the received optical signal using coherent optical reception. The first carrier phase estimation operation tracks relatively fast phase variations of the optical carrier of the received optical signal to produce a first carrier phase estimation and the second carrier phase estimation operation tracks relatively slow phase variations of the optical carrier of the received optical signal to produce a second carrier phase estimation. A difference between the first and second carrier phase estimations is computed. Occurrence of a cycle slip is determined when the difference is greater than a threshold. A correction is applied to the first carrier phase estimation when the low pass filtered difference exceeds the threshold.

20 Claims, 5 Drawing Sheets

(56) References Cited

U.S. PATENT DOCUMENTS

| | | | |
|---|---|---|---|
| 2012/0087679 A1* | 4/2012 | Goldfarb | 398/208 |
| 2012/0106982 A1* | 5/2012 | Wagner et al. | 398/208 |
| 2012/0121274 A1 | 5/2012 | Fludger | |
| 2012/0155890 A1* | 6/2012 | Zhou et al. | 398/208 |
| 2012/0237204 A1* | 9/2012 | Zhou | 398/25 |
| 2012/0251112 A1* | 10/2012 | Sadot et al. | 398/65 |
| 2012/0263481 A1* | 10/2012 | Ip et al. | 398/193 |
| 2012/0269507 A1* | 10/2012 | Renaudier et al. | 398/34 |
| 2013/0089341 A1* | 4/2013 | Roberts et al. | 398/208 |
| 2013/0089342 A1* | 4/2013 | Oveis Gharan et al. | 398/208 |
| 2013/0251369 A1* | 9/2013 | Ogasahara | 398/65 |
| 2013/0322870 A1* | 12/2013 | Geyer et al. | 398/25 |
| 2013/0329834 A1* | 12/2013 | Zhou, Xiang | 375/326 |
| 2014/0003555 A1* | 1/2014 | Shigihara et al. | 375/324 |
| 2014/0044440 A1* | 2/2014 | Endo et al. | 398/208 |
| 2014/0050493 A1* | 2/2014 | Sigron et al. | 398/202 |

OTHER PUBLICATIONS

C.R.S. Fludger et al; Cycle-slips in 100G DP-QPSK transmission systems; 2012; OFC/NFOEC technical digest.*

Ip, et al., "Feedforward Carrier Recovery for Coherent Optical Communications," Journal of Lightwave Technology, vol. 25, No. 9, Sep. 2007, pp. 2675-2692.

International Search Report and Written Opinion in counterpart International Application No. PCT/US2013/041497, mailed Jul. 25, 2013.

Viterbi, "Nonlinear Estimation of PSK-Modulated Carrier Phase with Application to Burst Digital Transmission," IEEE Transactions on Information Theory, vol. IT-29, No. 4, pp. 543-551, Jul. 1983.

* cited by examiner

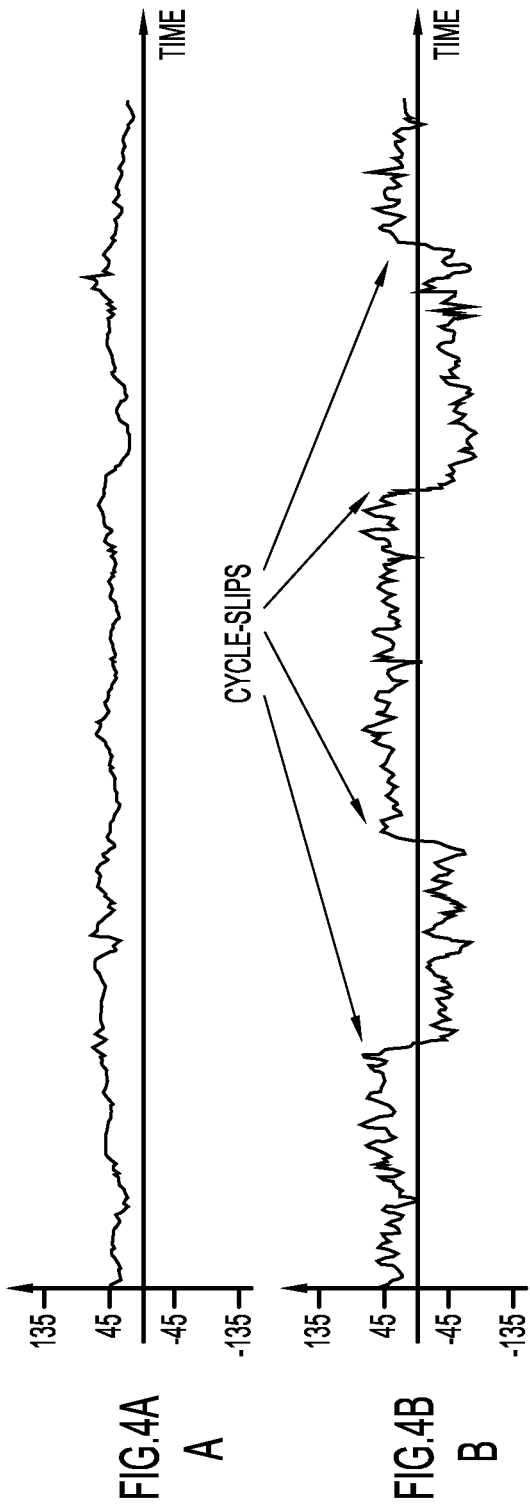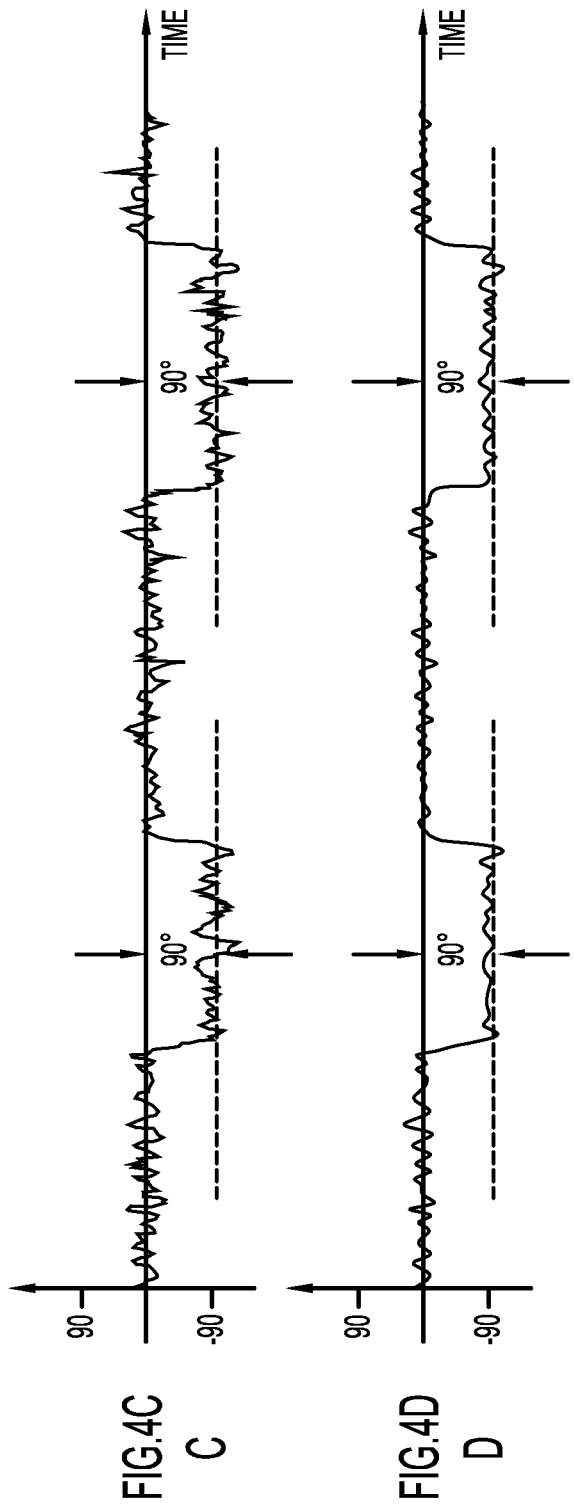

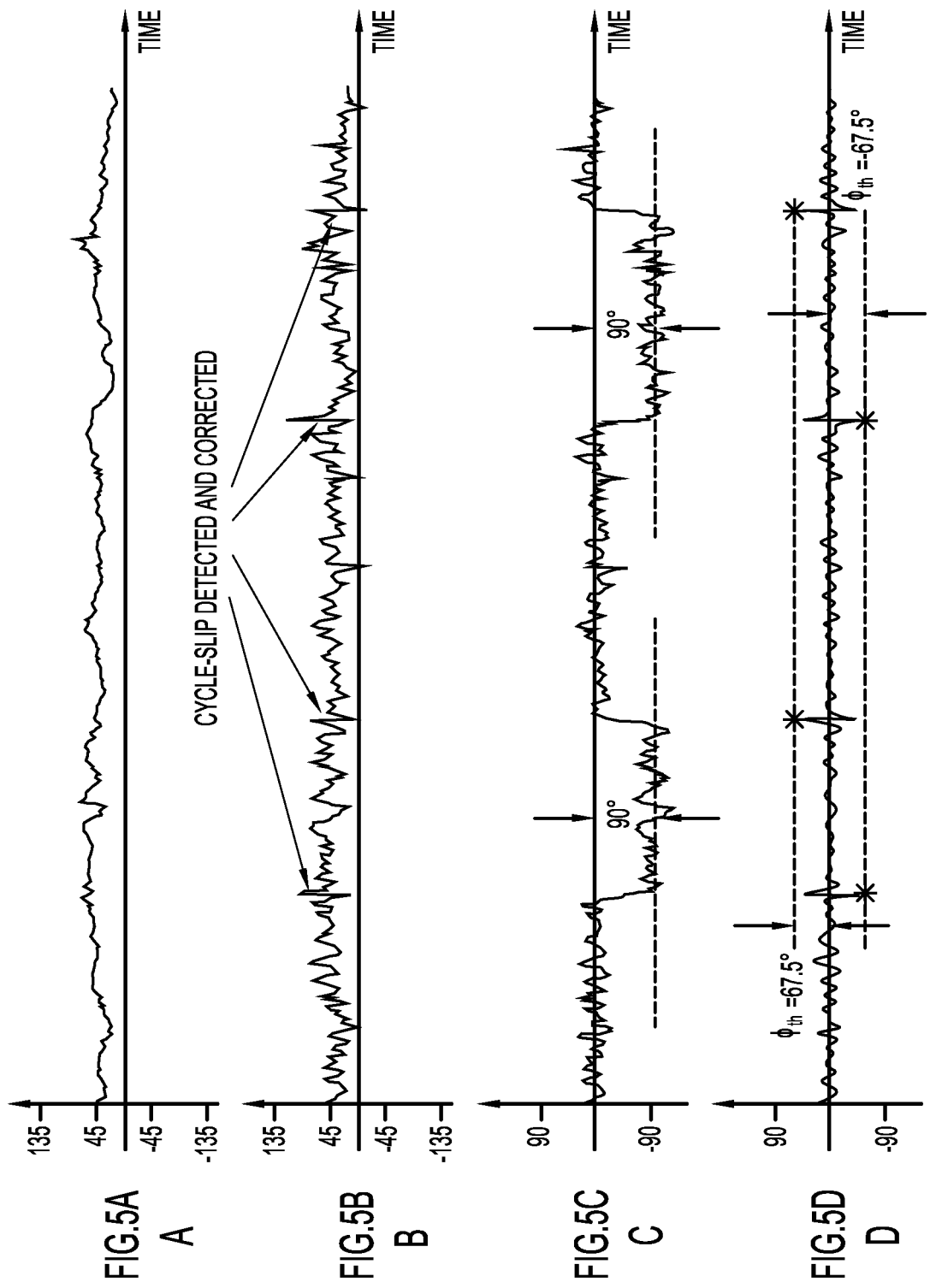

CYCLE SLIP REDUCTION IN COHERENT OPTICAL COMMUNICATIONS

TECHNICAL FIELD

The present disclosure relates to optical networks and communication systems.

BACKGROUND

In coherent optical communication systems, one or more optical carriers of an optical signal are amplitude and phase modulated for transmission over a fiber from one point to another point. At a receiver, the received optical signal is mixed down with a local optical carrier, and the one or more carriers of the received optical signal are recovered using signal processing techniques.

Cycle clip is relatively common occurrence in coherent optical communication systems. Cycle slip involves undesired rotation of the received symbol constellation during processing in the receiver. In the receiver, there is a carrier phase estimator function/component used prior to decoding the received symbols. Cycle slip rate increases with increased bandwidth of the carrier phase estimator function, increased laser phase-noise at the transmitter, increased Amplified Spontaneous Emission (ASE) noise and increased Cross Phase Modulation (XPM) noise. Reducing the occurrence of cycle slip can improve the forward error correction decoding operations at the receiver.

BRIEF DESCRIPTION OF THE DRAWINGS

FIGS. 4A-4D are signal plots that illustrate signals at various points of the optical receiver when cycle slip reduction is not performed.

FIGS. 5A-5D are signal plots that illustrates signals at the same points as in FIGS. 4A-4D, but when the multi-bandwidth carrier phase estimator is used to reduce cycle slip.

DESCRIPTION OF EXAMPLE EMBODIMENTS

Overview

Carrier phase estimation techniques are provided for processing a received optical signal having an optical carrier modulated according to a modulation scheme. The optical carrier is obtained from the received optical signal, and the optical carrier is converted to an electrical signal. The electrical signal is converted to a digital signal in a representation of complex numbers, each complex number being associated with a constellation point of a symbol constellation according to the modulation scheme. First and second carrier phase estimation operations are performed on a digital signal derived from an optical carrier obtained from the received optical signal using coherent optical reception. The first carrier phase estimation operation tracks relatively fast phase variations of the optical carrier of the received optical signal to produce a first carrier phase estimation and the second carrier phase estimation operation tracks relatively slow phase variations of the optical carrier of the received optical signal to produce a second carrier phase estimation. A difference between the first and second carrier phase estimations is computed. Occurrence of a cycle slip is determined when the difference is greater than a threshold. A correction is applied to the first carrier phase estimation when the low pass filtered difference is greater than the threshold.

Example Embodiments

Figure 1:
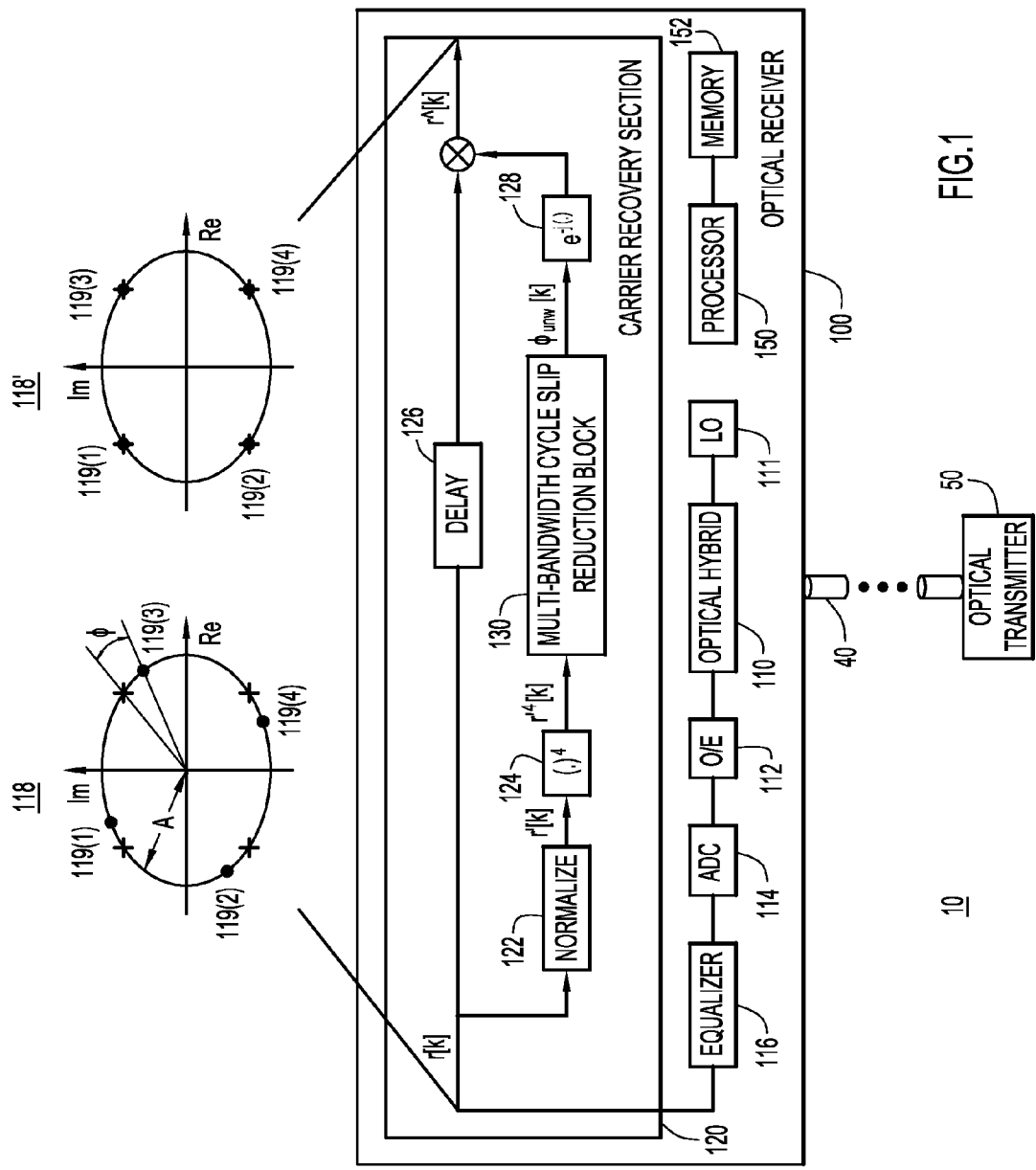
FIG. 1 is an example of a block diagram of an optical communications system in which an optical receiver includes a multi-bandwidth carrier phase estimator configured to reduce cycle slip.

Reference is first made to FIG. 1 that shows an optical communications system 10 comprising an optical transmitter 50 and an optical receiver 100. The optical transmitter 50 transmits one or more optical signals to the optical receiver 100 over an optical fiber 40. The distance between the optical transmitter 50 and optical receiver 100 may be up to thousands of kilometers.

The optical receiver 100 comprises a 90° optical hybrid 110, an optical local oscillator 111, an optical-to-electrical converter (O/E) 112, an analog-to-digital converter (ADC) 114, an equalizer 116 and a carrier recovery section 120. Downstream of the carrier recovery section 120 is a decoder, e.g., a forward error correction (FEC) decoder, but for simplicity, the decoder is not shown in FIG. 1. The optical hybrid 110 is a multi-port device that comprises linear dividers and combiners interconnected in such a way that different additions of a local oscillator (LO) optical signal from optical local oscillator 111 (e.g., a laser) and the received optical signal are obtained. The optical hybrid 110 and optical LO 111 form a coherent optical receiver and operate to obtain an optical carrier from a received optical signal using coherent optical reception techniques. The optical hybrid 110 operates as an optical mixer in this regard. The optical receiver 30 is referred to as a digital coherent receiver because it employs an optical hybrid 110 and optical LO 111 in this configuration.

The optical signal transmitted by the transmitter 50 comprises an optical carrier that has been amplitude and phase modulated according to a modulation scheme. One example of a modulation scheme is Quadrature Phase Shift Keying (QPSK). Other examples of modulation schemes include 8 Quadrature Amplitude Modulation (QAM), 16 QAM, etc. The output of the optical hybrid 110 is an optical carrier signal (at the wavelength used for transmission of the optical signal).

The O/E 112 is, for example, a photodetector that converts the optical carrier signal output from the optical hybrid 110 to an electrical signal. The ADC 114 converts the electrical signal to a digital signal, and the equalizer performs an equalization operation on the digital signal to account for linear and non-linear distortions and other issues in the optical signal path. The digital signal is in a representation of complex numbers, where each complex number is associated with a constellation point of a symbol constellation according to the modulation scheme used to modulate the optical signal that was transmitted by the optical transmitter 50. The output of the equalizer 116 is denoted r[k] in FIG. 1, and r[k] is an equalized digital signal. FIG. 1 shows a symbol constellation 118 comprising four points 119(1), 119(2), 119(3) and 119(4) associated with a complex input symbol. It should be noted that FIG. 1 shows the signal processing chain for one carrier (wavelength). In optical systems that use multiple wavelength subchannels (multiple carriers) to simultaneously transmit on multiple optical signals (at each of the different wavelengths), there is a signal processing chain consisting of an optical hybrid, local oscillator, O/E, ADC and equalizer, for each wavelength subchannel.

FIG. 1 shows a carrier phase $\phi$ of the signal r[k] that is a rotation of the constellation 118 by up to +/−180 degrees. The carrier phase needs to be estimated and then corrected by applying a rotation with angle $-\phi$. The carrier phase estimation might give an error of multiples of 90° due to the 90° ambiguity of, e.g., the QPSK constellation. Such an error is called a cycle slip. Digital differential encoding and decoding can be used for stable operation of a hard-decision FEC decoder in the optical receiver 100 even in the presence of cycle slips. Reduction of the cycle slip probability is desirable for stable operation of a "best-in-class" soft-decision FEC decoder in the optical receiver 100.

The carrier recovery section 120 is configured to reduce cycle slips using, as described hereinafter, parallel first and second carrier phase estimation operations on the equalized digital signal (symbol) r[k]. The carrier recovery section 120 comprises a normalize block 122, a $4^{th}$-power $[(.)^4]$ block 124, a delay block 126, a rotation block $[e^{-j(\cdot)}]$ 128 and a multi-bandwidth cycle slip reduction block 130 between the $4^{th}$ power block 124 and the rotation block 128. The normalize block 122 performs a normalization operation on the complex input r[k] to produce a normalized complex symbol r'[k]. The $4^{th}$-power block 124 performs a $4^{th}$ power computation on the normalized complex symbol r'[k] to produce a quantity $r'^{4[k]}$.

Generally, the multi-bandwidth cycle slip reduction block 130 performs in parallel first and second carrier phase estimation operations on the output of the $4^{th}$-power block 124. The first carrier phase estimation operation with relatively short-term averaging is performed to track relatively fast phase variations of the optical carrier of the received optical signal to produce a first carrier phase estimation. The second carrier phase estimation operation with relatively long-term averaging is performed to track relatively slow phase variations of the optical carrier of the received optical signal with high noise averaging and to produce a second carrier phase estimation.

The output of the multi-bandwidth cycle clip reduction block 130 is an angle $\phi_{unw}[k]$ that is supplied to the rotation block 128. The rotation block 128 generates an exponential vector to rotate the delayed symbol output from the delay block 126 to produce a complex output symbol r^[k]. FIG. 1 shows a diagram of the complex output symbol r^[k] with the angle $\phi$ removed or compensated for as shown at 118'.

The theory underlying the operations of the multi-bandwidth cycle clip reduction block 130 is that cross phase modulation noise is "zero mean", that is, its mean value does not change. In other words, cross phase modulation noise has no random walk. The bandwidth of cross phase modulation phase noise is relatively large, which means that a high bandwidth in the carrier phase estimator is needed to be able to track the very fast phase changes. The first carrier phase estimation accounts for these relatively fast phase variations, e.g., caused by cross phase modulation. Laser phase noise, on the other hand, is slowly changing so that a low bandwidth (e.g., less than 2 MHz) and slower carrier phase estimation can be used.

The operations of the carrier recovery section 120 may be implemented by digital signal processing techniques in a fixed or programmable signal processor device, e.g., by digital logic hardware gates configured to perform the computations described herein. For example, the signal processor device may be embodied in an application specific integrated circuit (ASIC), digital logic gates in a programmable logic device, such as an field programmable gate array (FPGA) or as a programmable processor device, e.g., a microprocessor 150 that executes software instructions stored in a computer readable storage media (e.g., a memory) 152. Memory 152 may comprise read only memory (ROM), random access memory (RAM), magnetic disk storage media devices, optical storage media devices, flash memory devices, electrical, optical, or other physical/tangible memory storage devices. Thus, in general, the memory 152 may comprise one or more tangible (non-transitory) computer readable storage media (e.g., a memory device) encoded with software comprising computer executable instructions and when the software is executed (by the processor 150) it is operable to perform the operations described herein. In a software/microprocessor implementation, the processor 150 would receive as inputs the output of the equalizer 116.

Figure 2:
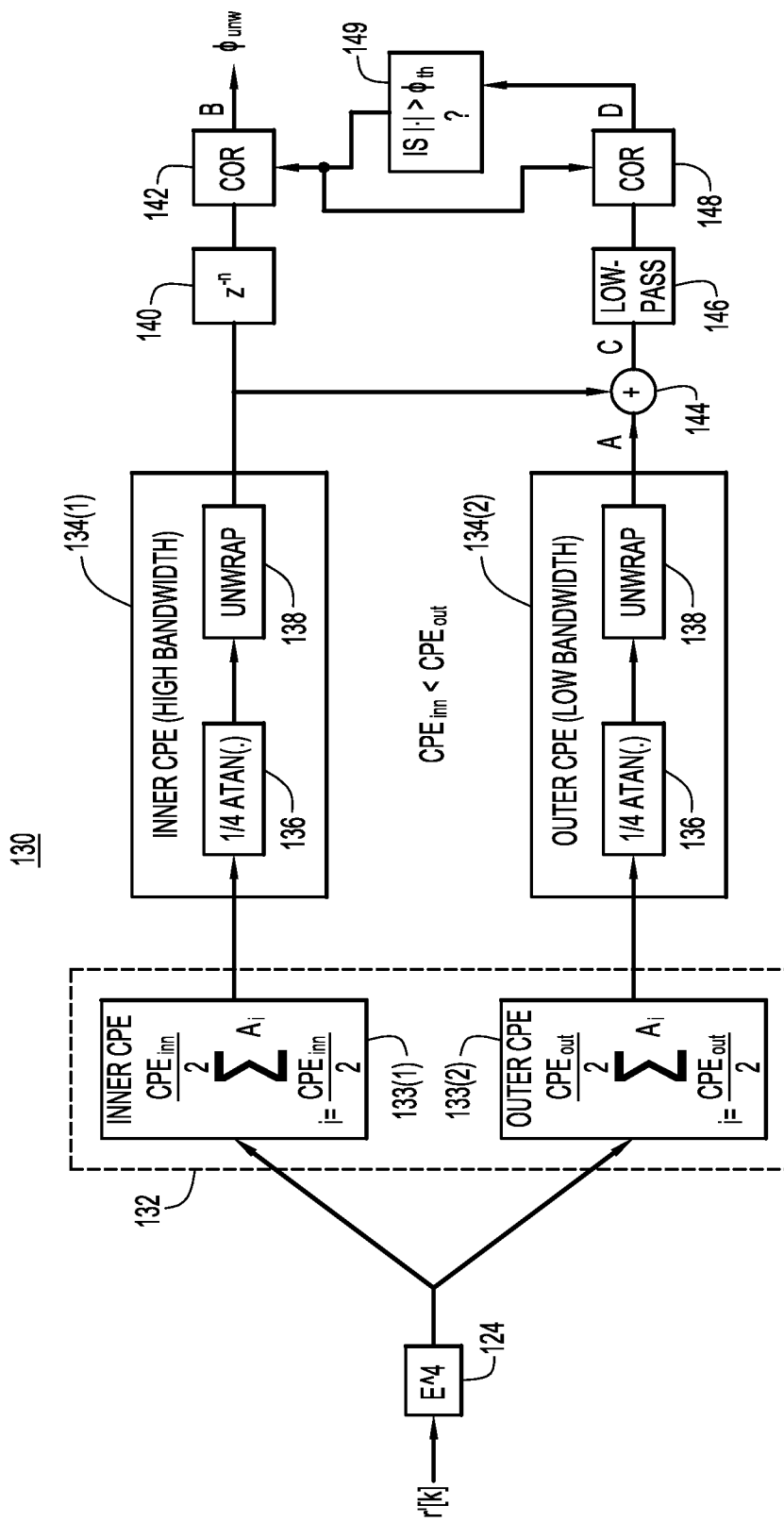
FIG. 2 is an example block diagram of the multi-bandwidth carrier phase estimator.

Reference is now made to FIG. 2 for a more detailed description of the multi-bandwidth cycle clip reduction block 130. The multi-bandwidth cycle clip reduction block 130 comprises a dual bandwidth averaging block 132 having a first averaging path 133(1) that averages over an inner carrier phase estimation (inner CPE) bandwidth and a second averaging path 133(2) that averages over an outer CPE bandwidth. The first averaging path 133(1) averages the quantity $r'^4[k]$ over a first number of symbols, from $-CPE_{inn}/2$ to $+CPE_{inn}/2$, and the second averaging path averages the quantity $r'^4[k]$ over a second number of symbols from, $-CPE_{out}/2$ to $+CPE_{out}/2$, where the first number of symbols $CPE_{inn}$ is less than the second number of symbols $CPE_{out}$. The first and second averaging paths 133(1) and 133(2) may be implemented by two adder trees or by a single adder tree. The higher the CPE value in the averaging, the more symbols over which the average is computed, resulting in a lower bandwidth of the carrier recovery. A low bandwidth of the CPE is desired in order to remove noise due to ASE. On the other hand, the bandwidth should be high enough in order to follow the fast fluctuations of the carrier phase, e.g. due to cross phase modulation.

The output of the first averaging path 133(1) is supplied as input to an inner CPE (high bandwidth) processing path 134 (1) and the output of the second averaging path 133(2) is supplied as input to an outer CPE (low bandwidth) processing path 134(2). Each of the processing paths 134(1) and 134(2) have an arctangent divided by 4 (¼ a tan(.)) operation 136 followed by an unwrap operation 138. The angles computed by the arctangent operations 136 in the inner CPE processing path 134(1) and the outer CPE processing path 134(2) represent values from negative 45 degrees to positive 45 degrees. The unwrap operations 138 in each of these processing paths follows phase drift and add or subtract 90 degrees when necessary, so that the unwrapped phase spans the whole circle. The output of the inner CPE (high bandwidth) processing path 134(1) is referred to as a first carrier phase estimation and the output of the outer CPE (low bandwidth) processing path 134(2) is referred to as a second carrier phase estimation.

When only a single averaging path (and a single bandwidth processing path) is used (as in conventional carrier phase recovery techniques), it is possible that the unwrapping operation is performed erroneously over high phase noise or high ASE noise, resulting in cycle slip, thereby causing rotation of plus/minus 90 degrees in the symbol constellation after carrier recovery, as depicted at 118 in FIG. 1. The probability for such a cycle slip event increases with increasing bandwidth of the carrier phase estimator. However, by having two parallel (simultaneous) carrier phase estimation paths, one to track relatively fast phase variations (using a high bandwidth) and the other to track relatively slow phase variations (using a low bandwidth), the resulting carrier phase estimate can be accurate, while having a comparably low cycle slip rate. The output of the inner CPE (high bandwidth) processing path 134(1) is a first carrier phase estimation (an angle) and the output of the outer CPE (low bandwidth) processing path 134(2) is a second carrier phase estimation (an angle).

The output of the inner CPE (high bandwidth) processing path 134(1) is supplied to a Z-transform operation block 140 that performs a $z^{-n}$ operation, which is a delay of n symbol periods. The output of the Z-transform operation block 140 is supplied to one input of correction (cor) block 142. The Z-transform block 140 is useful to control the timing, i.e., when a correction is to be applied. The output of the outer CPE (low bandwidth) processing path 134(2) is supplied to one input of an adder 144. The output of the inner CPE (high bandwidth) processing path 134(1) is supplied to a negative input other input of the adder 144 so that the adder 144 subtracts the output of the inner CPE processing path 134(1) from the output of the outer CPE processing path 134(2) to produce a difference. The difference produced by the adder 144 is a difference between the first and second carrier phase estimations and this difference represents a detected erroneous rotation of the symbol constellation by multiples of 90°. There is a low pass filter connected to the output of the adder 144, and another correction block 148 connected to the output of the low pass filter 146.

The low pass filter 146 receives as input the difference output by the adder 144. The low pass filter 146 filters the difference to produce a low pass filtered difference quantity. The correction blocks 142 and 148 are controlled by the comparator 149. The comparator 149 compares the absolute value of the low pass filtered difference with a threshold, $\phi_{th}$, and if the low pass filtered difference is greater than the threshold, the correction blocks 142 and 148 are activated to apply corrections. In particular, if the low pass filtered difference exceeds the threshold, then the correction block 142 applies a correction of plus or minus 90 degrees, where the negative sign of the low pass filtered signal is used. The correction block 142 applies a correction to the output of the Z-transform block 140 to produce a phase rotation estimate derived from the first carrier phase estimate, denoted $\phi_{unw}$. The phase rotation estimate is applied to a delayed version of a complex symbol, r̂[k], by the rotation block 128 in FIG. 1. Likewise, if the low pass filtered difference exceeds the threshold, then the correction block 148 applies a correction (of plus or minus 90 degrees) to the low pass filtered difference that is used in the comparison operation by the comparator 149. The correction blocks 142 and 148 have identical functionality.

Figure 3:
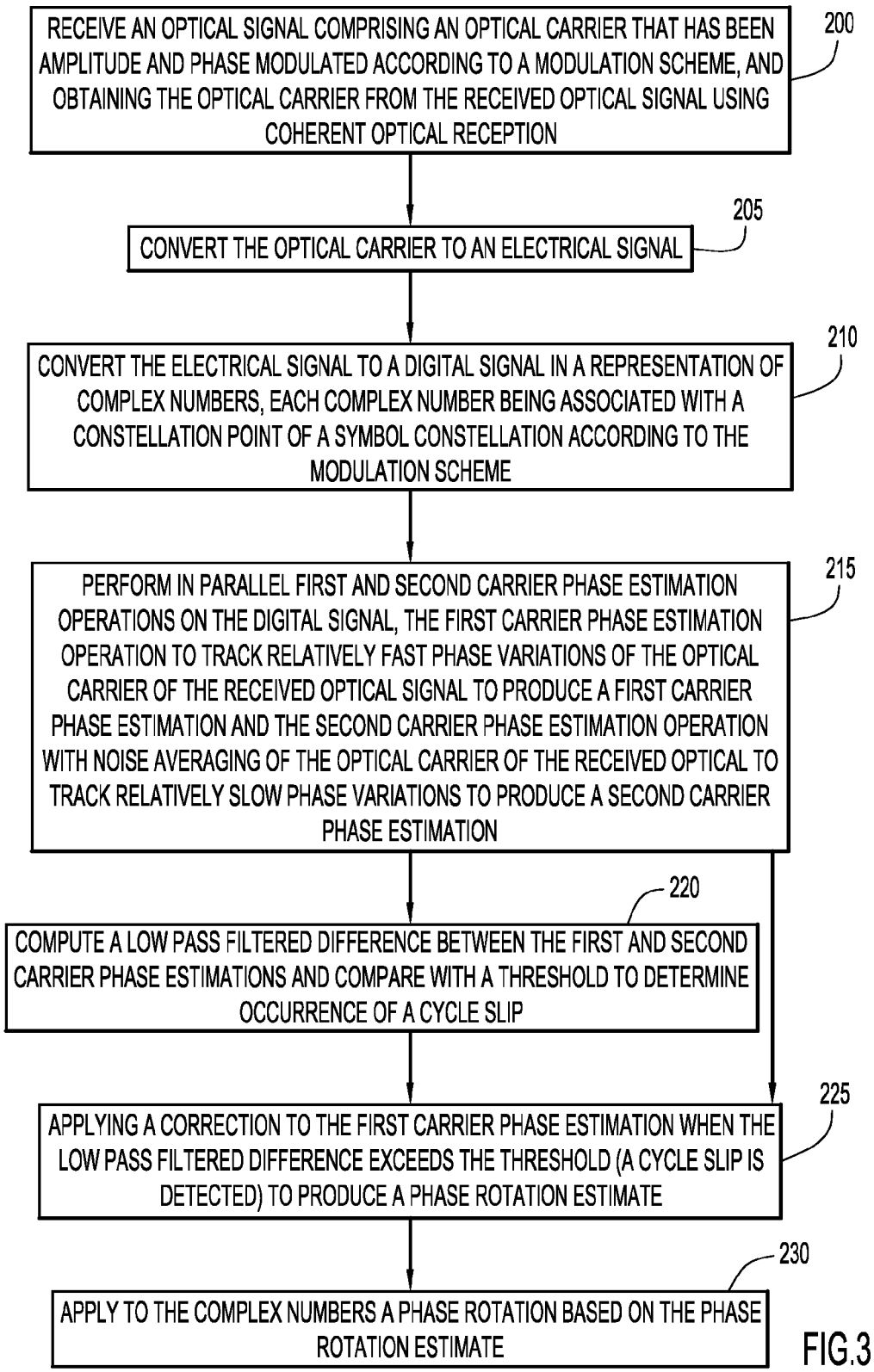
FIG. 3 is a flow chart generally depicting the operations of the multi-bandwidth carrier phase estimator.

Reference is now made to FIG. 3 for a description of a flow chart that depicts and summarizes the operations of the multi-bandwidth cycle slip reduction block 130. At 200, an optical signal is received that comprises an optical carrier that has been amplitude and phase modulated according to a modulation scheme, and the optical carrier is obtained from the received optical signal using coherent optical reception (by operation of the optical hybrid 110 and optical LO 111). At 205, the optical carrier is converted to an electrical signal (e.g., by the O/E 112). At 210, the electrical signal is converted to a digital signal in a representation of complex numbers, each complex number being associated with a constellation point of a symbol constellation according to the modulation scheme.

At 215, first and second carrier phase estimation operations are performed in parallel on the digital signal. The first carrier phase estimation operation tracks relatively fast phase variations of the optical carrier of the received optical signal to produce a first carrier phase estimation and the second carrier phase estimation operation (with noise averaging of the optical carrier of the received optical) tracks relatively slow phase variations to produce a second carrier phase estimation. At 220, a (low pass filtered) difference is computed between the first and second carrier phase estimations to detect plus or minus 90 degrees rotation of the symbol constellation. At 225, the low pass filtered difference is compared with a threshold and occurrence of a cycle slip is detected when the difference is greater than a threshold and a correction (of plus or minus 90 degrees) is applied to the first carrier phase estimation when the low pass filtered difference exceeds the threshold (a cycle slip is detected) to produce a phase rotation estimate. An example of a suitable threshold is 67.5 degrees. At 230, a phase rotation is applied to the complex numbers based on the phase rotation estimate derived at operation 225.

Reference is now made to FIGS. 4A-4D. These diagrams illustrate example plots of signals taken at points A-D labeled in FIG. 2 when phase rotation correction is not performed or used. FIG. 4A illustrates a plot of the signal at the output of the outer CPE processing block 134(2). FIG. 4B illustrates a plot of the signal at the output of the cor block 142. FIG. 4B illustrates the cycle slip (phase rotation) that occurs at the time intervals noted in the figure. FIG. 4C illustrates a plot of the difference computed between the output of the first and second carrier phase estimates. FIG. 4D illustrates that the signal plot without correction for carrier phase rotation will include phase offsets that reflect the cycle slip events indicated in the plot of FIG. 4B. Notably, FIG. 4B illustrates that the signal that is used for controlling the phase rotation applied by rotation block 140 (FIG. 1) has cycle slips and is out of phase by 90 degrees at those time periods when the cycle slips occurred.

FIGS. 5A-5D illustrate signal plots similar to FIGS. 4A-4D but with correction applied to reduce the cycle slips. In this example, the threshold $\phi_{th}$ is set to 67.5 degrees, which is ¾ of 90 degrees. FIGS. 5A and 5C are signal plots that are similar to FIGS. 4A and 4C, respectively. FIG. 5D illustrates the signal at the output of the correction block 148 (in FIG. 2) and FIG. 5B illustrates the output of the correction block 142 when a correction is applied because the comparator 149 determines that the threshold $\phi_{th}$ is exceeded by a low pass filtered output of the adder 144. As shown in FIG. 5B, by applying cycle slip detection using the signal processing operations depicted in FIGS. 2 and 3, fast variations in carrier phase can be tracked without cycle clips.

The following simulation was made to test the benefits of the techniques described herein. The simulation used a moving average (over 9 symbols) for the operation of the low pass filter 146. The parameters of the simulation are as follows:

Random Walk Phase Noise: $\sigma = 0.015$
Colored Phase Noise
AWGN: $\sigma = 0.4$

| Slow CPE Processing Path: | Fast CPE Processing Path: |
|---|---|
| CPE = 32 | CPE = 4 |
| Bit Error Rate (BER) = $4e^{-2}$ | BER = $2.7e^{-2}$ |
| Phase Slip Probability = $1e^{-4}$ | Phase Slip Probability = $4e^{-3}$ |

Combination of the Slow and Fast Processing Paths:
BER = $2.8e^{-2}$
Phase Slip Probability = $1e^{-4}$ Thus, this simulation indicates that using the multi-bandwidth carrier phase estimation techniques described herein greatly reduces the phase slip probably with only a slight increase in BER.

In summary, the techniques described herein involve comparing a high bandwidth carrier phase estimation with a low bandwidth carrier phase estimation. If there is a deviation between the two that exceeds a threshold, then the result of the high bandwidth carrier phase estimation is corrected (by up to plus/minus 90 degrees). The Z-transform operation ($z^{-n}$) is used to control when the carrier phase estimation correction is applied.

The techniques described herein may be used as a cycle slip estimator that estimates the number of corrections needed to be made per unit time. Several symbols around a detected cycle slip could be set to a predetermined value, e.g., "0", to serve as an "erasure" that may improve FEC decoder performance. Thus, the output of the comparator 149 may be used to store an indication of the number of cycle slip occurrences that occur over time.

As explained above in connection with FIG. 1, there may be optical signals at multiple wavelength subchannels simultaneously received from an optical transmitter. Accordingly, the cycle slip reduction/compensation techniques described herein may be employed for each of the wavelength subchannels.

In addition to the method described herein, the cycle slip reduction techniques may be embodied in an apparatus that comprises an optical hybrid, an optical-to-electrical converter, an analog-to-digital converter and a signal processor. The optical hybrid is configured to receive from an optical fiber a received optical signal comprising an optical carrier that has been amplitude and phase modulated according to a modulation scheme, to obtain the optical carrier using a local oscillator optical signal. The optical-to-electrical converter is configured to convert the optical carrier to an electrical signal. The analog-to-digital converter is configured to convert the electrical signal to a digital signal in a representation of complex numbers, each complex number being associated with a constellation point of a symbol constellation according to the modulation scheme. The signal processor is coupled to receive the digital signal as input and is configured to: perform in parallel first and second carrier phase estimation operations on the digital signal, the first carrier phase estimation operation to track relatively fast phase variations of the optical carrier of the received optical signal to produce a first carrier phase estimation and the second carrier phase estimation operation to track relatively slow phase variations of the optical carrier of the received optical signal to produce a second carrier phase estimation; compute a difference between the first and second carrier phase estimations; and determine occurrence of a cycle slip when the difference is greater than a threshold.

Moreover, the cycle clip reduction concepts may be embodied in one or more computer readable storage media encoded with software comprising computer executable instructions and when the software is executed operable to: perform in parallel first and second carrier phase estimation operations on a digital signal derived from a received optical signal whose optical carrier is obtained using coherent optical reception, the digital signal being a representation of complex numbers each being associated with a constellation point of a symbol constellation according to a modulation scheme used to modulate one or more carriers of the optical signal, the first carrier phase estimation operation to track relatively fast phase variations of the optical carrier of the received optical signal to produce a first carrier phase estimation and the second carrier phase estimation operation to track relatively slow phase variations of the optical carrier of the received optical signal to produce a second carrier phase estimation; compute a difference between the first and second carrier phase estimations; and determine occurrence of a cycle slip when the difference is greater than a threshold.

The above description is intended by way of example only.

What is claimed is:

1. A method comprising:
   receiving an optical signal comprising an optical carrier that has been amplitude and phase modulated according to a modulation scheme and obtaining the optical carrier from the received optical signal using coherent optical reception;
   converting the optical carrier to an electrical signal;
   converting the electrical signal to a digital signal in a representation of complex numbers, each complex number being associated with a constellation point of a symbol constellation according to the modulation scheme;
   performing in parallel first and second carrier phase estimation operations on the digital signal, the first carrier phase estimation operation to track relatively fast phase variations of the optical carrier of the received optical signal to produce a first carrier phase estimation and the second carrier phase estimation operation to track relatively slow phase variations of the optical carrier of the received optical signal to produce a second carrier phase estimation;
   computing a difference between the first and second carrier phase estimations; and
   determining occurrence of a cycle slip when the difference is greater than a threshold.

2. The method of claim 1, further comprising:
   low pass filtering the difference to produce a low pass filtered difference;
   comparing the low pass filtered difference with a threshold; and
   applying a correction to the first carrier phase estimation when the low pass filtered difference is greater than the threshold, to produce a phase rotation estimate.

3. The method of claim 2, wherein applying the correction to the first carrier phase estimation comprises applying a correction of plus or minus 90 degrees.

4. The method of claim 2, further comprising performing a delay on the first carrier phase estimation prior to applying the correction to the first carrier phase estimation.

5. The method of claim 2, further comprising applying the phase rotation estimate to a delayed version of the digital signal.

6. The method of claim 1, wherein performing the first and second carrier phase estimation operations comprises, for the first carrier phase estimation operation, averaging over a first number of symbols to produce a first average, and for the second carrier phase estimation operation, averaging over a second number of symbols to produce a second average, wherein the first number is less than the second number.

7. The method of claim 6, wherein performing the first and second carrier phase estimation operations further comprises computing a first angle using an arctangent operation of the first average, and computing a second angle using an arctangent operation of the second average.

8. The method of claim 7, wherein performing the first and second carrier phase estimation operations further comprises performing an unwrapping operation on the first angle to produce the first carrier phase estimation and performing an unwrapping operation on the second angle to produce the second carrier phase estimation.

9. The method of claim 1, further comprising storing an indication of the number of cycle slip occurrences over time.

10. The method of claim 1, further comprising applying a correction to the first carrier phase estimation when the difference is greater than a threshold.

11. The method of claim 1, further comprising setting values to one or more symbols to a predetermined value upon detection of the cycle clip.

12. An apparatus comprising:
- an optical hybrid configured to receive from an optical fiber an optical signal comprising an optical carrier that has been amplitude and phase modulated according to a modulation scheme, to obtain the optical carrier from the received optical signal using a local oscillator optical signal;
- an optical-to-electrical converter configured to convert the optical carrier to an electrical signal;
- an analog-to-digital converter configured to convert the electrical signal to a digital signal in a representation of complex numbers, each complex number being associated with a constellation point of a symbol constellation according to the modulation scheme; and
- a signal processor coupled to receive the digital signal as input, the signal processor configured to:
  - perform in parallel first and second carrier phase estimation operations on the digital signal, the first carrier phase estimation operation to track relatively fast phase variations of the optical carrier of the received optical signal to produce a first carrier phase estimation and the second carrier phase estimation operation to track relatively slow phase variations of the optical carrier of the received optical signal to produce a second carrier phase estimation;
  - compute a difference between the first and second carrier phase estimations; and
  - determine occurrence of a cycle slip when the difference is greater than a threshold.

13. The apparatus of claim 12, wherein the signal processor is further configured to:
- low pass filter the difference to produce a low pass filtered difference;
- compare the low pass filtered difference with a threshold; and
- apply a correction to the first carrier phase estimation when the low pass filtered difference is greater than the threshold, to produce a phase rotation estimate.

14. The apparatus of claim 13, wherein the signal processor is configured to apply the correction of plus or minus 90 degrees to the first carrier phase estimation.

15. The apparatus of claim 14, wherein the signal processor is further configured to apply the phase rotation estimate to a delayed version of the digital signal.

16. The apparatus of claim 12, wherein the signal processor is further configured to store an indication of the number of cycle slip occurrences over time.

17. One or more non-transitory computer readable storage media encoded with software comprising computer executable instructions and when the software is executed operable to:
- perform in parallel first and second carrier phase estimation operations on a digital signal derived from a received optical signal whose optical carrier is obtained from the received optical signal using coherent optical reception, the digital signal being a representation of complex numbers each being associated with a constellation point of a symbol constellation according to a modulation scheme used to modulate one or more carriers of the optical signal, the first carrier phase estimation operation to track relatively fast phase variations of the optical carrier of the received optical signal to produce a first carrier phase estimation and the second carrier phase estimation operation to track relatively slow phase variations of the optical carrier of the received optical signal to produce a second carrier phase estimation;
- compute a difference between the first and second carrier phase estimations; and
- determine occurrence of a cycle slip when the difference is greater than a threshold.

18. The non-transitory computer readable storage media of claim 17, further comprising instructions operable to:
- low pass filter the difference to produce a low pass filtered difference;
- compare the low pass filtered difference with a threshold; and
- apply a correction to the first carrier phase estimation when the low pass filtered difference is greater than the threshold, to produce a phase rotation estimate.

19. The non-transitory computer readable storage media of claim 18, wherein the instructions operable to apply the correction comprise instructions operable to apply the correction to the first carrier phase estimation comprises applying a correction of plus or minus 90 degrees.

20. The non-transitory computer readable storage media of claim 19, further comprising instructions operable to apply the phase rotation estimate to a delayed version of the digital signal.

* * * * *